United States Patent [19]

Anderson et al.

[11] Patent Number: 5,137,607
[45] Date of Patent: Aug. 11, 1992

[54] REACTOR VESSEL USING METAL OXIDE CERAMIC MEMBRANES

[75] Inventors: Marc A. Anderson, Madison; Walter A. Zeltner, Oregon, both of Wis.

[73] Assignee: Wisconsin Alumni Research Foundation, Madison, Wis.

[21] Appl. No.: 515,884

[22] Filed: Apr. 27, 1990

[51] Int. Cl.⁵ .......................... C25B 3/00; C25B 9/00
[52] U.S. Cl. .................................... 204/59 R; 204/80; 204/130; 204/157.5; 204/157.15; 204/262; 204/263; 204/266; 204/265; 429/111; 422/186
[58] Field of Search ............ 204/59 R, 80, 129, 144.5, 204/262, 263, 265, 266, 157.15, 157.4, 157.5, 157.52, DIG. 3; 429/111; 422/186

[56] References Cited

U.S. PATENT DOCUMENTS

| | | | |
|---|---|---|---|
| T 873,015 | 4/1970 | Finnerty, Jr. et al. | 204/193 |
| 2,685,564 | 8/1954 | Emmett, Jr. et al. | 204/144.5 |
| 3,431,188 | 3/1969 | Ito et al. | 204/157.1 |
| 3,458,418 | 7/1969 | Beckmann | 204/157.15 |
| 3,476,669 | 11/1969 | Beckmann et al. | 204/193 |
| 3,554,887 | 1/1971 | Feehs | 204/157.15 |
| 3,628,010 | 12/1971 | Oberwil et al. | 250/43 |
| 4,124,464 | 11/1978 | Miyatani et al. | 204/129 |
| 4,240,882 | 12/1980 | Ang et al. | 204/280 |
| 4,257,867 | 3/1981 | Hammond et al. | 204/283 |
| 4,619,838 | 10/1986 | Meier et al. | 204/157.15 |
| 4,650,554 | 3/1987 | Gordon | 204/129 |
| 4,650,648 | 3/1987 | Beer et al. | 422/186.07 |
| 4,790,923 | 12/1988 | Stillman | 204/268 |
| 4,892,712 | 1/1990 | Robertson et al. | 204/157.15 |
| 5,006,248 | 4/1991 | Anderson et al. | 210/500.25 |
| 5,028,568 | 7/1991 | Anderson et al. | 501/12 |
| 5,035,784 | 7/1991 | Anderson et al. | 204/158.14 |

FOREIGN PATENT DOCUMENTS

| | | | |
|---|---|---|---|
| 0043394 | 11/1978 | Japan | 204/263 |
| WO8900983 | 2/1989 | World Int. Prop. O. | |
| WO8900985 | 2/1989 | World Int. Prop. O. | |

Primary Examiner—John Niebling
Assistant Examiner—Kathryn Gorgos
Attorney, Agent, or Firm—Quarles & Brady

[57] ABSTRACT

A reaction vessel for use in photoelectrochemical reactions includes as its reactive surface a metal oxide porous ceramic membrane of a catalytic metal such as titanium. The reaction vessel includes a light source and a counter electrode. A provision for applying an electrical bias between the membrane and the counter electrode permits the Fermi levels of potential reaction to be favored so that certain reactions may be favored in the vessel. The electrical biasing is also useful for the cleaning of the catalytic membrane.

17 Claims, 4 Drawing Sheets

FIG. 5
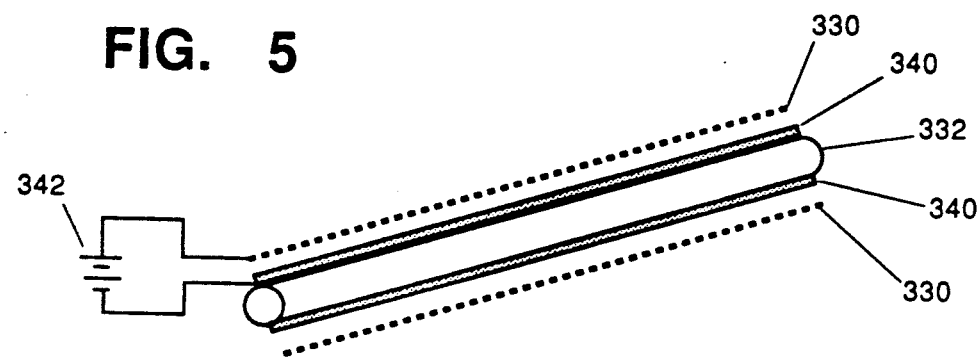
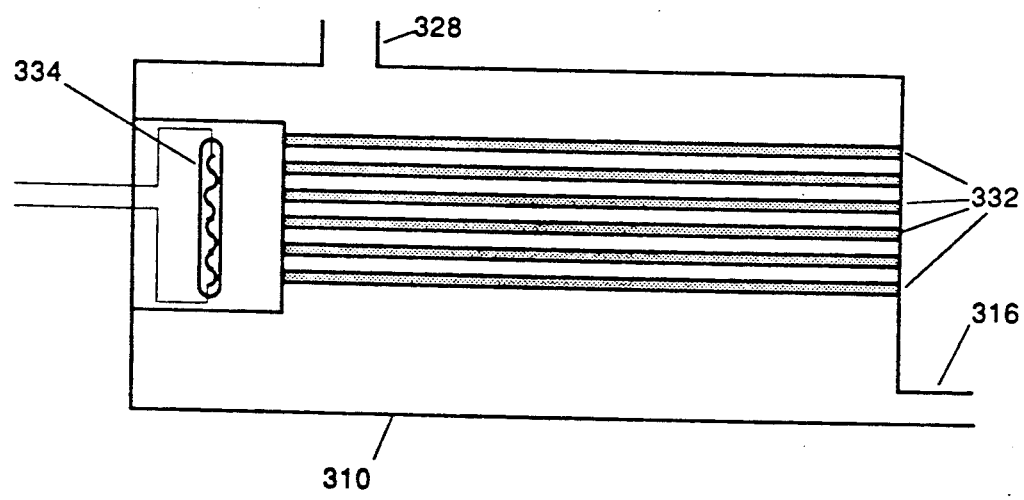
FIG. 6

REACTOR VESSEL USING METAL OXIDE CERAMIC MEMBRANES

FIELD OF THE INVENTION

The present invention relates to an electrochemical or photo-electrochemical reaction vessel or container, and relates, in particular, to an electrochemical reaction vessel specifically adapted for convenient operation of electrochemical or photoelectrochemical reactions.

BACKGROUND OF THE INVENTION

It has previously been known that certain photochemical reactions may be performed more readily in an apparatus or a vessel which includes a provision for photoillumination of the reaction substrates, as well as their exposure to certain catalytic agents. For example, U.S. Pat. No. 3,476,667 discloses an apparatus for a photochemical reaction which includes a series of lamps disposed in the reaction vessel and suitable means to stir an appropriate solution within the reaction vessel to ensure mixing of reactives. Cooling tubes may also be provided in such a device to facilitate any necessary cooling to dissipate excess heat created by the energy released from the reaction.

Certain types of photochemical reactions in which the incident energy of reaction is provided by light radiation can be electrically biased to facilitate certain reaction products At least one example is known, as shown in U.S. Pat. No. 4,124,464, of the use of a catalytic semiconductor anode in a water photolysis cell driven by incident solar radiation and in which the catalytic electrode is electrically biased so as to facilitate the hydrolysis of water in the desired reaction. It has been the previous practice in the art for such a reactor, which requires a transition metal electrode to properly catalyze the reaction, to fabricate the transition metal electrode in a single piece, the surface area of which is increased by scoring or other forms of indentation, such as disclosed in the above identified patent.

It has been previously demonstrated in the art that certain forms of metal oxide materials can be created which have a greatly enhanced surface area. One form of such metal oxide materials is known as a metal oxide ceramic membrane The metal oxide ceramic membranes are typically formed of transition metal elements, such as titanium, silicon, zinc or other similar elements which have useful catalytic or photocatalytic properties. The metal oxide membranes are ceramic in that they are formed of a plurality of initially discrete particles which are fused together in a sintering or fusing process, usually by baking in an oven, to form a continuous unitary and solid material. Such metal oxide ceramic materials are referred to as membranes in that, when fired at appropriate temperatures (e.g. up to 550° C. for $TiO_2$ and 1000° C. for $Al_2O_3$), the resulting materials are porous, in the sense that materials may actually flow through the membranes if the support substrate is porous. Thus, the membranes may be thought of as analogous to biological membranes in that they are porous to materials of certain sizes, have a characteristic particle size and size of typical and maximum pores, but are by contrast formed of relatively rigid and stable inorganic metal oxide covalent bonds. It has been previously demonstrated, as exemplified by published PCT application WO 89/00985, that a metal oxide ceramic membrane can be usefully applied to the photodegradation of complex organic molecules.

SUMMARY OF THE INVENTION

The present invention is summarized in that an photoelectrochemical reactor includes a metal oxide ceramic membrane inside of a reaction vessel, a light source arranged so as to be able to illuminate the metal oxide ceramic membrane, a counter electrode also in the reaction vessel, and electrical biasing means connected to a counter electrode and the metal oxide ceramic membrane so that reactions can be run which are catalyzed by the metal in the metal oxide ceramic membrane, and in which the Fermi level of the reaction can be adjusted so as to favor desired actions and reaction products.

It is an object of the present invention to provide a photoelectrochemical reaction vessel which may be used for a wide variety of photoelectrochemical or electrochemical reactions which may be catalyzed by metal oxide ceramic materials.

It is another object of the present invention to provide a photoelectrochemical reaction vessel which provides for improved contact to the catalytic agent and good throughput of the reaction materials.

It is yet another object of the present invention to provide an photoelectrochemical reaction vessel in which the substrate of the catalytic agent may be electrically biased, and the electrical bias may be altered so as to remove from the catalytic membrane any metals or other materials deposited thereon.

Other objects, advantages, and features of the present invention will become apparent from the following specification when taken in conjunction with the accompanying drawings.

BRIEF DESCRIPTION OF THE DRAWINGS

FIG. 5 is a plan view of yet another embodiment of a reaction vessel using optical fibers as a light source.

FIG. 6 is a schematic view of a coated optical fiber from the apparatus of FIG. 5.

DESCRIPTION OF THE PREFERRED EMBODIMENT

In accordance with the present invention, a reaction vessel is described which is particularly suitable for photochemical, electrochemical, or photoelectrochemical reactions. In that regard, the reaction vessel is particularly designed so as to permit the input of light, so as to readily make available to the reaction substrates a catalytic material, and further it is provided with electrical biasing means so that the particular desired reaction can be favored over other possible reactions by appropriately electrically biasing the contents of the vessel.

Figure 1:
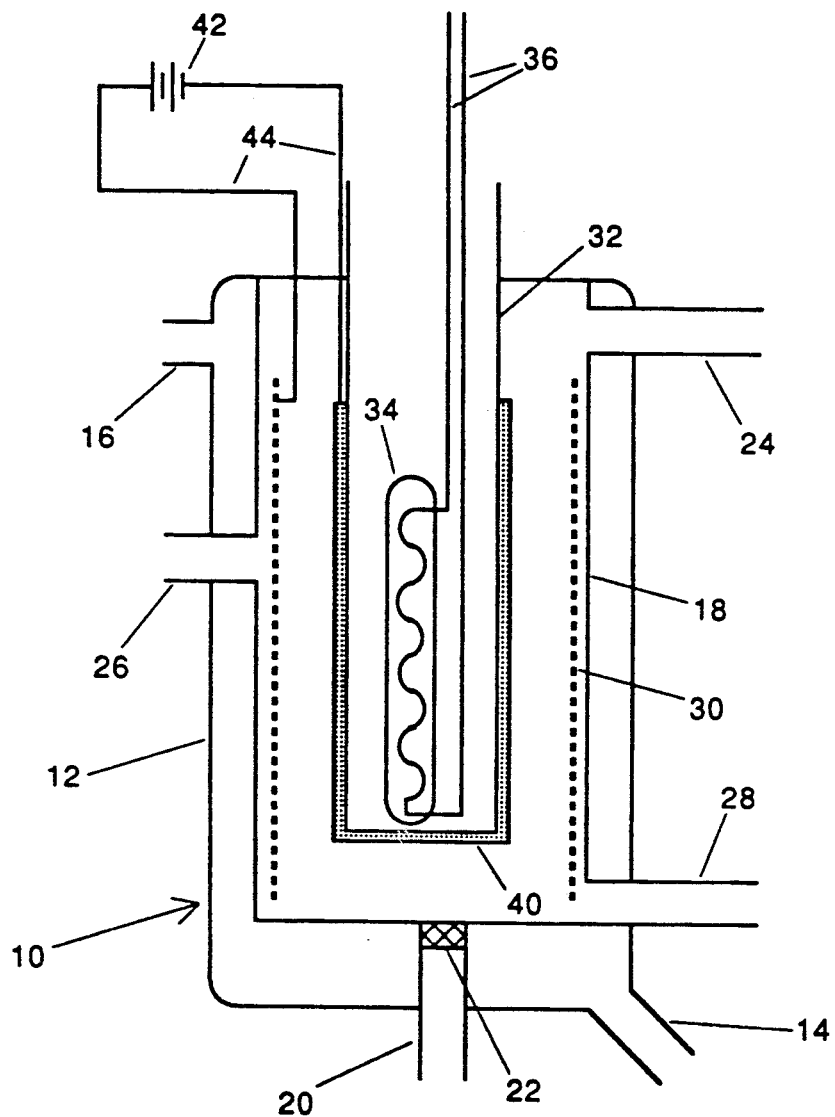
FIG. 1 is a plan schematic view of an photoelectrochemical reaction vessel constructed in accordance with the present invention.

Shown in FIG. 1 is a schematic cross-sectional view of an embodiment of an photoelectrochemical reaction vessel, generally designated at 10, constructed in accordance with the present invention The exterior of the reaction vessel 10 includes a cooling chamber or jacket 12 disposed around the entire exterior of the reaction vessel 10. A cooling fluid entry port 14 and a cooling fluid exit port 16 are provided so as to permit the entry and removal of cooling fluids The ports could, of course, be reversed, or provided at any desired locale within the exterior of the cooling vessel 12, so long as the input and output ports permit the flow of cooling fluid around the exterior of the reaction vessel 10.

Inside of the cooling chamber 12 is located a reaction chamber 18. Located extending downward from bottom of the center portion of the reaction chamber 18 is a gas entry port 20 which has positioned in its upper end a glass frit 22. The glass frit 22 is intended to prevent the flow of liquids down into the gas entry port 20. A gas outlet port 24 is provided extending outward from the top of the reaction chamber 18. A liquid entry port 28 extends into the reaction chamber 18 and a liquid outlet port 26 extends outward from the other side thereof. It is to be understood that the reaction vessel is intended both for use with liquid and gaseous phase reactions, but that, however, if only a particular phase, i.e. either liquid or gas, is desired the inlet and outlet ports for the phase not utilized in the reaction could be omitted from the particular reaction vessel for that reaction.

Positioned just inside of the exterior walls of the reaction chamber 18 is a counter electrode 30. The counter electrode is formed of an electrically conductive material suitable for the particular photoelectrochemical reaction which is to take place in the reaction vessel. The counter electrode is preferably of a mesh or grid configuration, so as to have a relatively large surface area exposed to the fluids inside of the reaction chamber 18. Such a counter electrode might preferably be formed of platinum, carbon, or other highly durable conductive material. In many applications, it would be desirable for the reaction chamber 18 to be of cylindrical shape, in which case the counter electrode 30 can be a cylindrical cage of material positioned and spaced just inside of the interior walls of the reaction chamber 18.

Centrally located in the reaction chamber 18 is an inner tube 32. While the other components of the reaction vessel 10, such as the cooling jacket 12 and the reaction container 18, may be formed of any particular durable material as is appropriate, such as metallic, glass, or any other durable material, it is desired and advantageous that the material of the inner tube 32 be of a transparent material, such as glass. The inner tube 32 is a cylindrical member extending into the reaction chamber 18 which is closed at its bottom end. Positioned inside of the inner tube 32 is a light source in the form of a lamp 34 connected by suitable electrical wiring, indicated at 36, to an external source of electric power (not shown) capable of providing illuminating electrical energy to the lamp 34.

The inner tube 32 serves as a support surface for a layer of a metal oxide ceramic membrane 40 coated on the exterior of the tube. The metal oxide ceramic membrane 40 is formed of an oxide of a metal having desirable catalytic properties, such as typically a transition metal element. Suitable metals for such a metal oxide ceramic membrane include titanium, silicon, zirconium, and other similar elements. The preferred metal oxide membrane is formed of titanium dioxide. The metal oxide ceramic membrane is a porous, durable material formed from the sintering or fusing of small particles of the metal oxide material together to form a unitary and continuous solid material. The metal oxide membrane need not be homogeneously formed of a single metal element, but could be a mixture of such elements. It is also possible, and will often be desirable, to dope the metal oxide membrane with a dopant element differing in valence from the predominant metal of the membrane. Such dopants may be used to increase the electrical conductivity of the membrane, by adding excess free electrons or holes, or to change the reaction characteristics of the membrane.

By suitable manipulation of the method of forming of the metal oxide ceramic membrane, and by varying the firing temperature, it is possible to create such a metal oxide membrane having a wide range of size of the constituent particles, and having a wide range of effective porosity. For catalytic purposes it may be desirous that the particles of the ceramic membrane be relatively small in size, and that the porosity be as large as is practical, in order to provide the highest available effective surface area of the catalyst to the reactants in the fluid inside of the reaction chamber 18. The fluid could be either gaseous or liquid. Alternatively, if the reaction in the vessel is also to include a filtration process, it may be desirable for the pores in the membrane to be of a smaller, defined size so that the membrane may be used for filtration as well as catalysis.

Such a mixed oxide ceramic membrane can be created on the exterior of a glass tube, such as the inner tube 32, by repeatedly dipping the glass tube into a sol of dilute and small particles of the metal oxide in suspension. As the tube is removed from the sol, the particles will accumulate on the exterior of the tube. Firing of the tube and coating together then yields a ceramic porous membrane adhered to the exterior of the glass tube 32. The thickness of the coating may be adjusted by varying the number of dippings or the number of firings so that numerous coats of material are added to the exterior of the inner tube 32 to create a membrane as thick as is desired for the particular application. In order that the metal oxide ceramic membrane be conducting, it is desirable to dope the sol, and thus the metal oxide ceramic material, with certain metal atoms having different valence than the predominant metal in the membrane, to provide excess electrons or holes. In addition, to facilitate electrical connection to the metal oxide ceramic membrane, it is helpful if the inner tube 32 has formed on its exterior surface a conductive layer, such as a very thin layer of metallic or metal oxide material, such as tin oxide, tungsten, aluminum, or other elemental metal. If such a metallic coating is utilized, electrical connection to the metal oxide ceramic membrane can be made merely by an electrical connection to the metallic coating on the exterior of the inner tube, which thus underlies the metal oxide ceramic membrane.

The light source could be positioned anywhere in the reaction vessel as is desired. Alternative forms of light source, such as fiber optic strands coated with the metal oxide membrane, may also be used.

The reaction vessel of FIG. 1 further includes an electrical biasing means 42 which is connected by suitable electrical connecting devices, such as is schematically indicated at 44, to both of the metal oxide ceramic membrane 40 and the counter electrode 30. The electrical biasing means 42 is preferably an electrical biasing device capable of applying a potential between the membrane 40 and the counter electrode 30. The potential would normally be a DC voltage in the range of several volts, but could in some applications desirably be an alternating voltage varying over time. In addition, it is desirable if the biasing means 42 is capable of reversing the polarity of the applied electrical potential so that the relative polarity of the potential applied between the membrane 40 and the counter electrode 30 can be reversed as desired.

The photoelectrochemical reaction vessel of FIG. 1 is intended to be a very flexible and adaptable reaction vessel in which can be conducted photoelectrochemical and photochemical reactions of a wide variety. It is particularly adapted for photoelectrochemical reactions in which it is advantageous to have an electrode with an adjustable Fermi level. By biasing the membrane 40 relative to the counter electrode 30, it is possible to adjust the Fermi level of the membrane to match that of the reaction to be taking place inside of the reaction vessel, so as to favor different reactions or to drive a reaction different than would normally occur in the absence of a biasing voltage.

The reaction vessel is particularly suitable for a number of reactions. For example, a reaction which may be catalyzed by a titania catalyst such as could be contained in the metal oxide ceramic membrane 40, is the conversion of methane ($CH_4$) and a hydroxyl group (OH) to methanol ($CH_3OH$). The provision of a biasing voltage between the electrodes of the reaction vessel facilitates the creation of the desired end product in this kind of reaction. In addition, since the reaction is capable of electrical biasing, it may be used for other similar reactions such as the hydrolysis of water.

Another particularly useful application for the reaction vessel of FIG. 1 comes about in the use of a reaction vessel such as that of FIG. 1 in a waste treatment process. It has previously been demonstrated that metal oxide titania membranes are useful for the photocatalysis of a variety of organic molecules into smaller less toxic organic molecules. This, therefore, suggests the use of metal oxide ceramic membranes as components of a waste treatment stream in which the large or durable complex organic molecules are reduced to smaller molecules which can readily be introduced into the environment without danger or harm. The reactor 10 of FIG. 1 may be used for such a process. However, waste streams eligible for such treatment are, almost by definition, heterogeneous and variable mixtures containing other impurities, including metals in solution or suspension, which could be reduced during the reaction to coat the exterior surface of the catalytic membrane 40. Thus, any design for such a reactor must include provisions for regenerating or cleaning the catalytic material. In order to clean any impurities or fouling materials which may be deposited on the membrane 40, it would be possible to cease the flow of the waste stream periodically, and then to apply a reversing voltage between the membrane 40 and the counter electrode 30, to drive the constituents or metals which have been coated onto the membrane back into solution, so that they may be washed from the reaction vessel 10. Through such a regeneration process of electrochemical stripping, the life and durability of the catalytic membrane used to catalyze the degradation of undesirable organic chemicals can be substantially lengthened. Because of the mechanical durability of the metal oxide ceramic membrane 40, other regeneration techniques may also be utilized to remove deposited material from the catalytic membrane. Useful regeneration techniques include washing with acids, burning of contaminants by high temperature treatment of the membrane (up to the original firing temperature), and steam cleaning of the membrane. Clearly any of these regeneration techniques would have the effect of prolonging the life of the reaction vessel by making the catalytic material more available for catalysis again.

Figure 2:
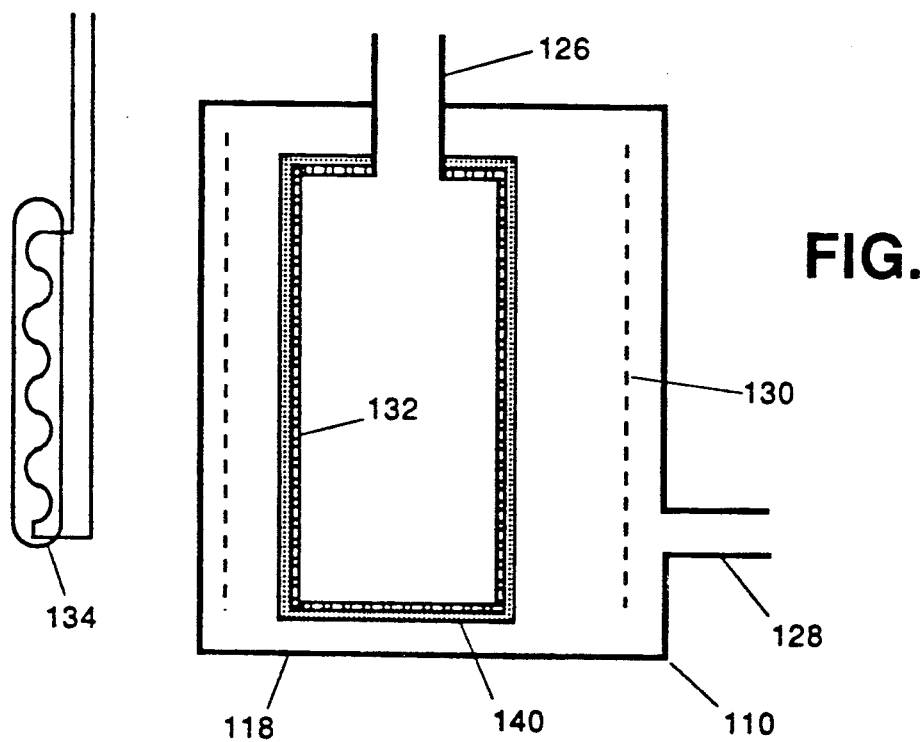
FIG. 2 is a schematic view of an alternative embodiment of a reaction vessel in accordance with the present invention which is particularly adapted to filtration as well as catalytic reaction.

Shown in FIG. 2 is an alternative embodiment of a reaction vessel 110 constructed in accordance with the present invention. In the reaction vessel 110, components similar to corresponding components of the reaction vessel 10 have been given similar reference numerals, a 100 prefix added to them. The reaction vessel 110 i a metal oxide membrane 140 applied to a support surface 132. In the reaction vessel 110, the support surface 132 is formed of a porous material, such as porous sintered stainless steel or a porous glass tube. The pores in the support surface 132 are preferably significantly larger than the average pore size in the membrane 140. The light source 134 in the reaction vessel 110 is not located in the center of the reaction vessel 110, but is located on at least one side, or optionally surrounding, the vessel 110. At least portions of the sides of the reaction chamber 118 must therefore be transparent. If desired, the light source 134 could be omitted so that sunlight may be used as the light source to energize the system. If solar illumination is used, the membrane 140 used must be capable of absorbing energy in the solar spectrum.

The advantage of the vessel 110 of FIG. 2 is that separations can be performed at the same time as catalysis. By withdrawing material from the inside of the porous support surface 132, the transfer of molecules smaller than the pore size of the membrane 140 into the interior of the vessel can be favored. This withdrawal could be assisted by vacuum pumping. Thus, as a reaction is catalyzed by the membrane 140, reaction products could be drawn through the membrane 140 and the porous support 132, so that additional reaction substrate is drawn in turn into the membrane.

Figure 3:
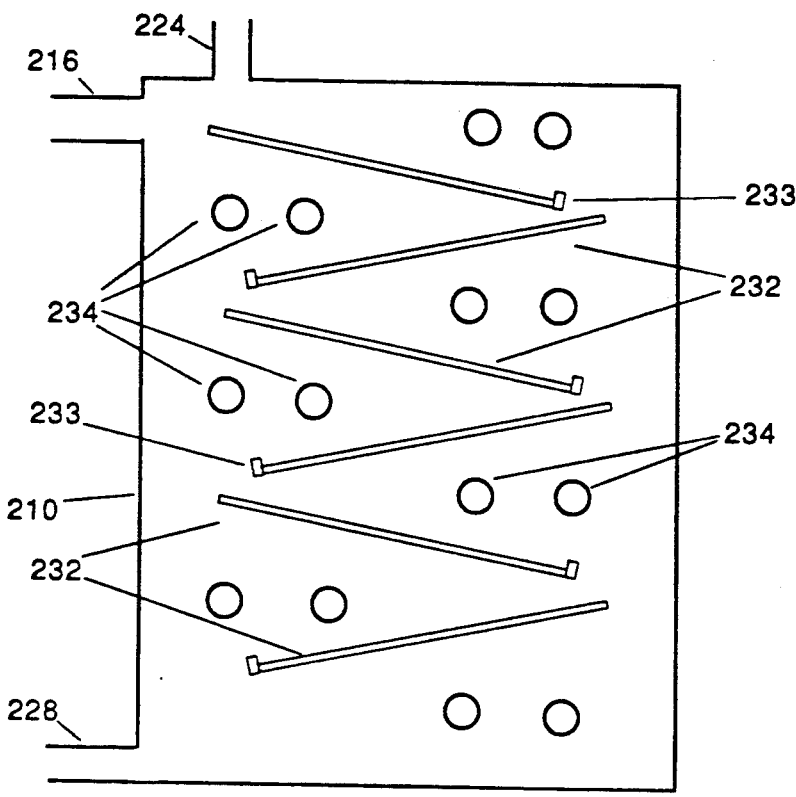
FIG. 3 is a schematic view of another alternative embodiment of a reaction vessel particularly designed for a mixed liquid and gas phase reaction.

Shown in FIG. 3 is another embodiment of a reactor vessel, this one designated 210, again with similar parts designated with similar reference numerals, with the prefix numeral 200. In the reactor vessel 210, there are a series of support surfaces 232 for the metal oxide membranes 240. The support surfaces 232 are preferably non-porous plates which have layers of the metal oxide membrane 240 coated onto both of their sides. A lip 233 may be located at the lower edge of each of the plates 232 to agitate liquid flow off of the plates 232 so as to facilitate the liberation of gases therefrom. The plates 232 are arrayed in a vertical array, at canted angles, with alternate plates 232 slightly horizontally staggered with respect to the immediately adjacent plates 232. The effect of this arrangement is that any liquid applied to the top of the uppermost plate will trickle down the upper surface plate, fall onto the upper surface of the next lower plate, and trickle down that plate, with the process proceeding vertically downward throughout the reaction vessel 210.

Figure 4:
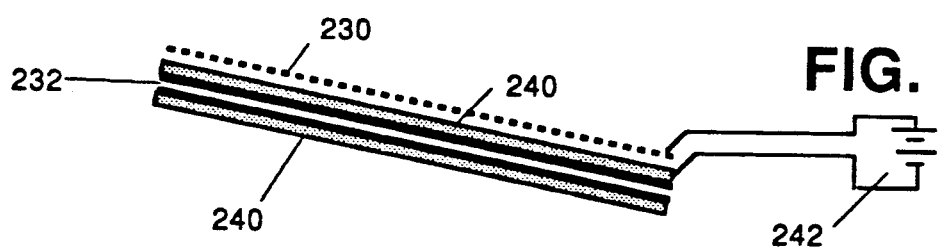
FIG. 4 is an enlarged sectional view of a plate from the vessel of FIG. 3.

In between the plates 232 of the vessel 210 are light sources, or lamps, 234. The lamps 234 are positioned so as to illuminate both the upper and lower surface of each plate 232. Shown in FIG. 4 is an enlarged view of a plate 232. On both the upper and lower surfaces of the plate 232, there is coated the membrane 240. Located just above the membrane 240 on the upper surface of each plate 232 is a counter electrode 230 in the form of a grid of conductive material. The counter electrode could alternatively be a transparent planar sheet, such as glass coated with a thin, transparent conductive layer. The counter electrode 230 is held spaced in position over the membrane 240 by an insulating mounting (not shown). Again, the membrane 240 may be doped so as to be conductive, and may also be layered over a conductive layer to further aid in electrical connection to the membrane. An electrical bias 242 is connected between the counter electrode 230 and the membrane 240 similarly as in the vessel 10.

The reaction vessel of FIGS. 3 and 4 is particularly well adapted for catalytic degradation of volatile contaminants in a liquid waste stream where the volatiles in the liquid waste stream must be degraded catalytically in liquid or gaseous form. Liquid is introduced onto the uppermost plate 230, and trickles down it and over the subsequent plates through the reactor. The electrical bias is provided between the counter electrode 230 and the membrane 240 to alter the Fermi level of the potential reactants in the liquid on the membrane 240. Thus preferably, the rate of liquid flow, and the cant of the plates 232, is adjusted so that the liquid immerses not only the membrane 240 but also the counter electrode 230. As the reactants are photodegraded, volatile gaseous products would vaporize from the liquid. Such gaseous products would then travel upward where they would contact the underside of the next uppermost plate 232. The gaseous phase products would thus contact the membrane 240 on the underside of the plate 232 and, since the area is exposed to the light source 234, would also be subject to photocatalytic degradation by the membrane 240. Thus both a liquid waste stream, and any volatile gaseous contaminants, whether originally in the stream or created by partial degradation, would be degraded by the vessel 10.

The vessel 210 retains the advantage of convenient regeneration. By reversing the electrical bias 242, with a wash stream circulating through the reactor 210, contaminants which were deposited on the membrane 240 could be driven off it into solution. Similarly, again because of the durable nature of the membrane 240, acidic or steam washing could be used to clean and regenerate the membrane 240.

Shown in FIG. 5 and 6 is another embodiment of a photoelectrochemical reaction vessel in accordance with the present invention. Shown in FIG. 5 is the basic working element of this embodiment. In this embodiment, in which similar parts are referred by numerals with a 300 prefix, the support surface 332 is an unclad or partially unclad optical fiber. By unclad or partially unclad, it is meant that the optical fiber is not provided with the reflective coating conventionally applied to such fibers commercially, since, contrary to many usual applications for such fibers, it is desired that at least some light exit from the fibers. A metal oxide ceramic membrane 340 is then coated onto the exterior of the optical fiber 332. The optical fibers 332 may be coated first with an electrically conductive material, such as tin oxide, to aid in electrical connection. A cylindrical counter electrode 330 surrounds the optical fiber 332. Thus, with the assembly of FIG. 5 immersed in a solution, and with an electrical bias applied between the membrane 340 and the counter electrode 330, the photodegradation of organic contaminants can proceed using light conducted inside the optical fiber 332, but able to partially escape each time the light reflects off the boundary of the unclad or partially clad optical fiber.

Shown in FIG. 6 is a reactor vessel 310 incorporating the optical fibers 332 of FIG. 5. At one end of the vessel 310, a light source 334 is positioned with one end of each of the optical fibers 332 extending to the light source 334. Thus, light of the proper spectrum, preferably in the ultraviolet, is conducted throughout the unclad or partially unclad optical fibers 332 and serves to activate the catalytic activity of the membranes 340 which coat them. Also again, the electrical bias permits selection of a reaction to favor and also permits regeneration of the membrane should it be fouled by contaminants.

The present invention is subject to many variations and additions which will be apparent to those of ordinary skill in the art. Accordingly, it is intended that the present invention not be limited to the particular embodiment illustration described above, but shall embrace all such modified forms thereof as come within the scope of the following claims.

What is claimed is:

1. An electrochemical reaction vessel comprising
   a reaction chamber;
   inlet and outlet means to permit entry of reaction substrates into the reaction chamber and reaction products out of the chamber;
   a counter electrode positioned in the reaction chamber;
   a metal oxide porous ceramic membrane positioned in the reaction chamber, the membrane formed of an oxide of a photocatalytic metal element, the reaction substrates being free to flow between the counter electrode and the membrane; and
   electrical biasing means electrically connected to both of the counter electrode and the membrane for applying an electric potential between the counter electrode and the membrane so as to favor chemical reactions photocatalyzed by the metal in the membrane which would not be favored to the same degree in the absence of an applied electrical potential.

2. A reaction vessel as claimed in claim 1 wherein the reaction chamber has an exterior and wherein there is a cooling jacket around the exterior of the reaction chamber to permit a coolant to cool any reaction in the reaction chamber.

3. A reaction vessel as claimed in claim 1 wherein the membrane is formed of titanium.

4. A reaction vessel as claimed in claim 3 wherein there are separate inlet and outlet ports for gases and for liquids.

5. A reaction vessel as claimed in claim 1 wherein there is also a source of light to energize the catalytic action of the membrane.

6. A reaction vessel as claimed in claim 5 further comprising an inner tube of transparent material in the center of the reaction chamber, the source of light being positioned inside of the inner tube.

7. A reaction vessel as claimed in claim 6 wherein metal oxide ceramic membrane is coated on the inner tube.

8. A reaction vessel as claimed in claim 7 wherein a layer of conductive metal is formed on the inner tube under the metal oxide ceramic membrane so as to provide convenient electrical connection thereto.

9. A reaction vessel for photocatalytic reactions comprising
   a reaction chamber;

an inlet for entry of reaction substrate into the chamber;

an outlet for exit of reaction products out of the chamber;

a light source;

an inner tube surrounding the light source and received centrally in the reaction chamber;

a porous ceramic membrane formed of discrete particles of a catalytic metal oxide sintered together coated on the inner tube;

a counter electrode located in the reaction chamber spaced from the inner tube, reaction substrates and reaction products being free to flow between the membrane and the counter electrode; and electrical biasing means connected to both of the counter electrode and the membrane to create an electrical potential therebetween so as to favor chemical reactions photocatalyzed by the metal in the membrane which would not be favored to the same degree in the absence of an applied electrical field.

10. A reaction vessel as claimed in claim 9 wherein there is a cooling jacket around the reaction chamber to permit a coolant to cool any reaction in the reaction chamber.

11. A reaction vessel as claimed in claim 9 wherein the membrane is a metal oxide porous ceramic membrane formed of a titanium oxide.

12. A reaction vessel as claimed in claim 9 wherein there is an inlet means for reaction substrates and an outlet means for reaction products to be introduced into and removed from the reaction chamber.

13. A reaction vessel as claimed in claim 12 wherein there are separate inlet and outlet means for gases and for liquids.

14. A reaction vessel as claimed in claim 9 wherein a layer of conductive metal is formed on the inner tube under the metal oxide ceramic membrane so as to provide convenient electrical connection thereto.

15. An electrochemical reaction vessel having a top and a bottom comprising a reaction chamber;

an inlet at the top of the reaction vessel;

an outlet at the bottom of the reaction vessel;

a plurality of canted support plates having upper and lower surfaces arranged in a vertical stack with adjacent members of the stack staggered so that liquid flowing from one plate will fall onto the plate below;

multiple light sources arranged so that light will be incident to the upper and the lower surfaces of the support plates; and a metal oxide porous ceramic membrane formed of discrete particles sintered together placed on the upper and the lower surfaces of each of the support plates, the metal in the metal oxide membrane having photocatalytic activity and located on the plates so that liquid will flow through the membrane on the upper surfaces to be photocatalytically reacted by the metal in the membrane and so that rising gases will contact the membranes on the lower surfaces to be photocatalytically reacted by the metal in the membrane there so that both liquid flowing through the vessel and gases emitted by such liquid may be photochemically reacted by the catalytic membranes in the same vessel.

16. A vessel as claimed in claim 15 wherein the vessel further includes electrical biasing means located above the upper surface of each support plate so as to favor desired reactions in liquid flowing on the upper surface of each of the support plates.

17. A method of utilizing a porous ceramic membrane formed of discrete particles sintered together, the particles formed from a catalytic transition metal element oxide to perform chemical processing, comprising the steps of providing a reaction vessel in which reactants are exposed to the catalytic transition metal element in the porous ceramic membrane, the reactor vessel also including a counter electrode, the reactants being free to flow between the membrane and the counter electrode;

applying an electrical bias between the membrane and the counter electrode with an external source of electrical potential;

introducing reactants into the vessel to be catalysized by the catalytic transition metal in the porous ceramic membrane such that the reactants are catalyzed by the catalytic metal in the membrane;

periodically removing the reactants from the vessel; and regenerating the porous ceramic membrane by reversing the electrical bias between the counter electrode and the porous ceramic membrane to remove any contaminants from the porous ceramic membrane so that the catalytic transition metal is exposed for further chemical processing.

* * * * *

UNITED STATES PATENT AND TRADEMARK OFFICE
CERTIFICATE OF CORRECTION

PATENT NO. : 5,137,607
DATED : August 11, 1992
INVENTOR(S) : Marc A. Anderson and Walter A. Zeltner It is certified that error appears in the above-identified patent and that said Letters Patent is hereby corrected as shown below:

Column 1, line 3, insert the following:

This invention was made with United States Government support awarded by the Department of Energy (DOE), Grant No. DE-AC05-84OR21400. The United States Government has certain rights in this invention.--

Signed and Sealed this

First Day of March, 1994

BRUCE LEHMAN

Attest:

Attesting Officer

Commissioner of Patents and Trademarks